United States Patent
Shinoda (10) Patent No.: US 8,154,431 B2
(45) Date of Patent: Apr. 10, 2012

(54) DATA GENERATOR PROVIDING LARGE AMOUNTS OF DATA OF ARBITRARY WORD LENGTH

(75) Inventor: Yoshikazu Shinoda, Tokyo (JP)

(73) Assignee: Tektronix International Sales GmbH, Rheinfall (CH)

( * ) Notice: Subject to any disclaimer, the term of this patent is extended or adjusted under 35 U.S.C. 154(b) by 60 days.

(21) Appl. No.: 12/828,147

(22) Filed: Jun. 30, 2010

(65) Prior Publication Data

US 2011/0018747 A1      Jan. 27, 2011

(30) Foreign Application Priority Data

Jul. 1, 2009   (JP) ................... 2009-157009

(51) Int. Cl.
*H03M 9/00*   (2006.01)
(52) U.S. Cl. ........................ 341/101; 341/144
(58) Field of Classification Search .............. 341/100, 341/101, 144, 106, 50; 710/33, 22; 711/100, 711/138
See application file for complete search history.

(56) References Cited

U.S. PATENT DOCUMENTS

| | | | |
|---|---|---|---|
| 6,411,230 B1 * | 6/2002 | Tauchen et al. | 341/101 |
| 6,732,205 B2 * | 5/2004 | Kamihara et al. | 710/71 |
| 7,028,108 B2 * | 4/2006 | Hiratsuka et al. | 710/33 |
| 7,245,396 B2 * | 7/2007 | Sakamoto | 358/1.9 |
| 2006/0155898 A1 | 7/2006 | Fujisawa | |
| 2007/0057827 A1 * | 3/2007 | Morrill | 341/101 |

* cited by examiner

*Primary Examiner* — Peguy Jean Pierre
(74) *Attorney, Agent, or Firm* — William K. Bucher (57) ABSTRACT

A waveform memory 66 stores data streams with each data stream having M-bit parallel data. A sequence memory 60 stores sequence information and data discard information on the amount of data to discard from the last data in each data stream. A sequencer 62 and a waveform memory controller 64 access the waveform memory 66 to provide the data streams using the sequence information. A barrel shifter 68 shifts data in the data stream according to the number of effective data of the last parallel data in the previous data stream if the number of the effective data is less than M. A data shift controller 100 generates data enables indicating whether the data in the data stream are effective or not based on the data discard information. A combiner 72 combines the effective data in the data stream using the data enables.

16 Claims, 8 Drawing Sheets

DATA GENERATOR PROVIDING LARGE AMOUNTS OF DATA OF ARBITRARY WORD LENGTH

BACKGROUND OF THE INVENTION

The present invention relates to data generation, and more specifically, to a data generator that can generate fast data having an arbitrary word length.

A signal generator is an apparatus that can store digital waveform data in the storage device such as a memory, hard disk drive (HDD), etc. The digital waveform data may be previously stored data defined by a standard, such as PCI Express or the like, or may be user defined digital waveform data. The digital waveform data is converted by the signal generator into an analog signal output.

One application for a signal generator is in developing a new electronic apparatus. The signal generator may provide an expected output signal from an uncompleted circuit block of the apparatus to a circuit block following the uncompleted circuit block to confirm whether the following circuit block works as expected. Another application is compliance testing where the signal generator provides a signal including intentional jitter or distortions to a circuit under test. Further, the signal generator may be used for measuring characteristics of a fast serial interface such as PCI Express, etc. The signal generator provides a signal having waveform patterns suitable for the characteristic testing and an oscilloscope is used to receive an output from the transmission lines to measure the characteristics with eye pattern display, etc. AWG7000B series signal generators, manufactured and sold by Tektronix, Inc., Beaverton, Oreg., are examples of such signal generators.

Figure 1:
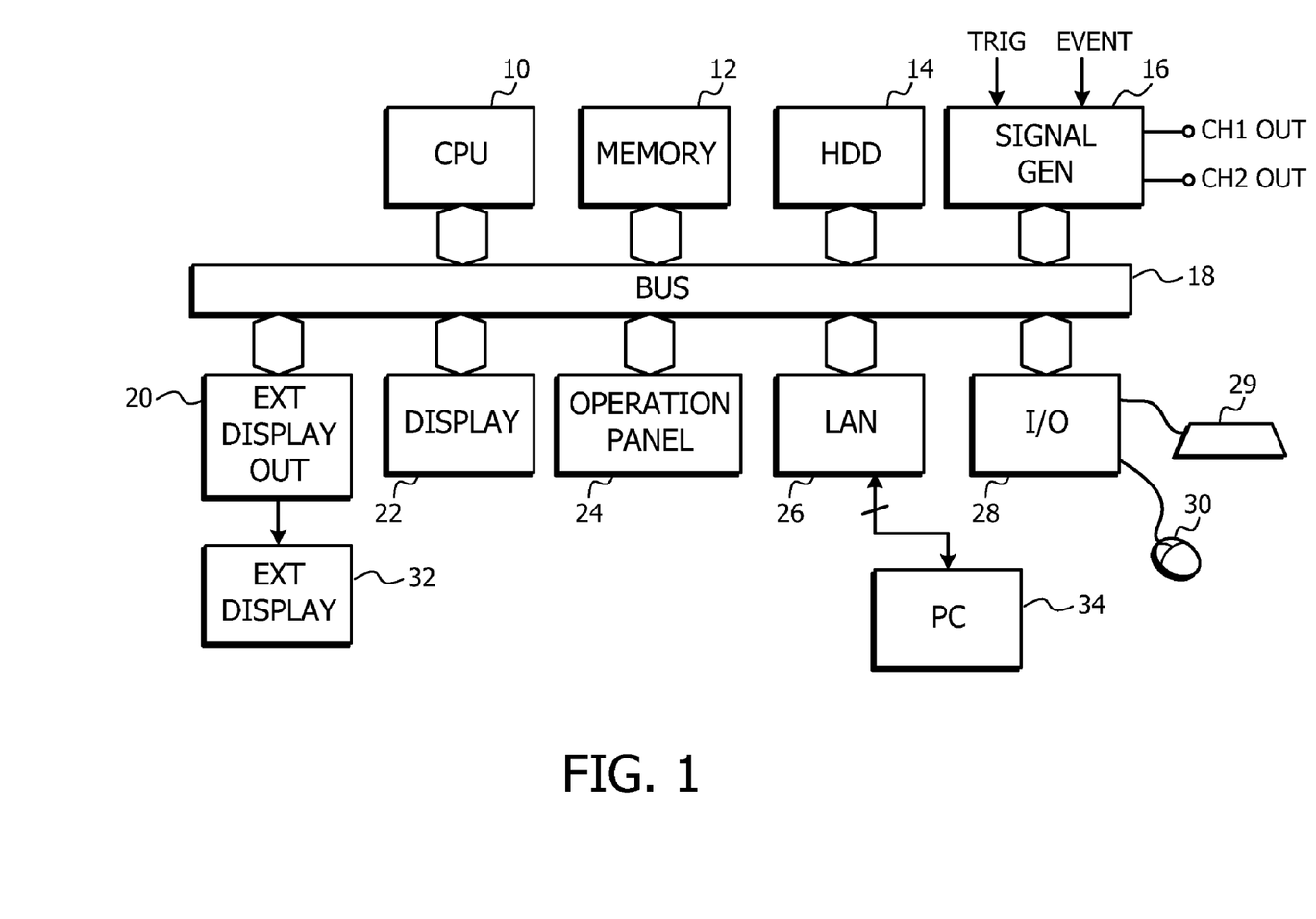
FIG. 1 is a block diagram of a signal generator.

FIG. 1 is an exemplary block diagram of a signal generator. A CPU (Central Processing Unit) 10 controls the signal generator system according to program stored in a hard disk drive (HDD) 14. The HDD 14 may also be used for storing a large amount of data, such as waveform generation software, digital waveform data and the like. A memory 12, such as RAM memory, is used for a work area for the CPU 10 to read programs from the storage device. A user can set up the signal generator via an operation panel 24 that includes keys, knobs, and the like. A display 22 provides visual information relating to signal patterns and user settings. An external display output circuit 20 provides a video output which may be connected to an external display 32 for providing a larger display area in addition to the built-in display 22 of the signal generator. A signal generation circuit 16 generates signal patterns based on user defined parameters. In this example, it has two channel outputs and inputs for trigger and event signals. Receipt of these signals enables conditional actions. An input/output port 28 is used for connecting an external keyboard 29, a pointing device 30, such as a mouse, and the like to the signal generator. The external keyboard 29 and/or pointing device 30 may be included as parts of the operation means of the signal generator. These blocks are coupled together via a bus 18. A LAN (Local Area Network) interface may be connected to the bus 18 to couple the signal generator to an external PC 34. The external PC 34 allows a user to remotely control the signal generator as desired.

Figure 2:
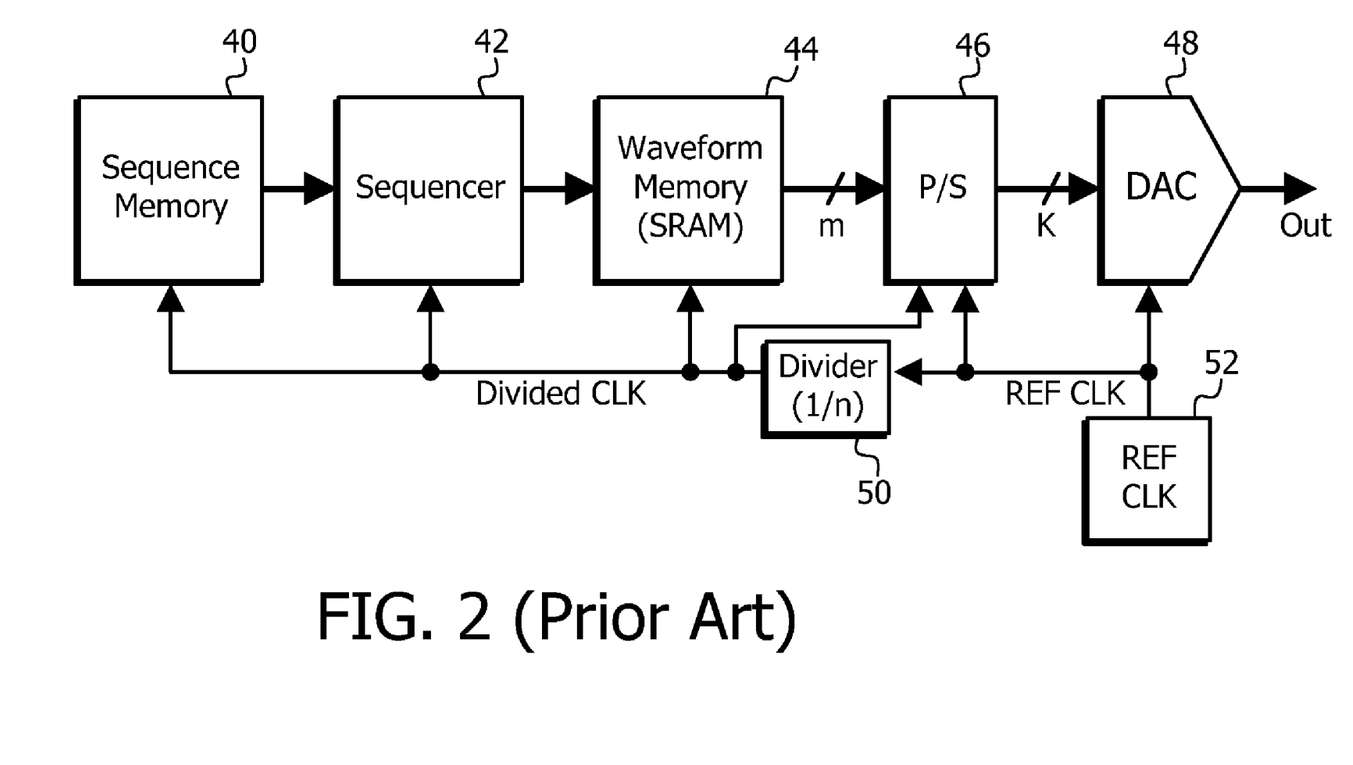
FIG. 2 is a block diagram of a conventional signal generation circuit.

FIG. 2 is a block diagram of a conventional signal generation circuit. For simplicity, a circuit having only one channel is shown but the operation of a two-channel circuit is similar. A reference clock generator 52 generates a reference clock which is coupled to a digital-to-analog converter (DAC) 48. The reference clock sets the timing of sampling points of an analog electric signal generated by the DAC 48. The reference clock may be referred to as a sampling clock in case of a signal generator. A divider 50 divides the reference clock by dividing ratio n (n is a natural number) to generate a divided clock that is synchronous with the reference clock but has a clock frequency of 1/n. The divided clock sets the timing for reading waveform data from a waveform memory 44.

The waveform memory 44 may be relatively fast operating memory such as SRAM (Static Random Access Memory) and stores waveform data as parallel data. In this example, let the bit number of the parallel data be m (m is a natural number). A sequence memory 40 stores sequence (output order) information for reading the waveform data from the waveform memory 44. A sequencer 42 derives addresses from the sequence information and provides the addresses to the waveform memory 44. The waveform memory 44 provides the waveform data as m-bit parallel data to a parallel-to-serial converter (P/S) 46.

The parallel-to-serial converter 46 receives the waveform data according to the divided clock and converts the m-bit parallel data to a lower bit number (K bit in this example; K is a natural number and less than m) parallel data and provides the K-bit parallel data to the DAC 48 according to the reference clock. A relationship exists between the m-bit parallel data and the K-bit parallel data in the form of m=K×n. These processes reduce the bit number but produces faster data according to the reference clock that is n times faster than the waveform data being read out from the waveform memory 44 according to the divided clock. At present, read-out speed of the memory is not high enough to produce a desired high frequency analog signal from the DAC 48. However, sufficient data acceleration is achieved by the parallel-to-serial converter 46 to generate a high frequency analog signal. The DAC 48 converts the K-bit parallel data to produce an analog electric signal. The output of the DAC is passed through a low pass filer (not shown) to produce a smooth analog signal as is known. One set of the parallel data may also be called one word because it corresponds to one sampling point of the output from the signal generator.

In the data acceleration described above, the data length after the data acceleration of the parallel to serial conversion through the P/S converter 46 is limited to an integer multiple of m since one set of the waveform data has m bits of data. That is, the parallel data that the DAC 48 receives can not have an arbitrary word length. For example, if m is 64 and K is 10, then 10 sets of 64 bit parallel data are read out. The number of the data bits is 640 which can be converted to 64 sets (words) of 10 bit parallel data. However, if 9 sets of 64 bit parallel data are read out, the total number of the data bits is 576 which can be converted to 57 sets (words) of 10 bit parallel data with 6 data bits left over that can not constitute one set of 10 bit parallel data.

U.S. Patent Application Publication 2006/0155898 discloses one solution on the above problem. A data memory provides 5 bit parallel data of which 4 bit or 5 bit data are effective, and a bit width identifier signal that indicates effective bit width of the parallel data to a FIFO (First In First Out) memory. The FIFO memory provides 4 bit parallel data having only the effective data using the bit width identifier signal, and then the 4 bit parallel data is converted to serial data. The combination of the 4 bit and 5 bit effective parallel data realizes a series of the effective data having an arbitrary length.

A signal generator is increasingly required to provide a signal of higher frequency for characteristic testing of a fast serial interface. At the same time, the signal generator should provide large amount of waveform data at low cost. Then, use of a lower cost memory such as DDR3 SDRAM as the waveform memory in place of an expensive SRAM may be considered for storing a large amount of data at low cost. Further, the use of FPGA (Field Programmable Gate Array) in place of dedicated ASIC (Application Specific Integrated circuits) may be preferable to achieving low cost even though a FPGA does not work as fast a an ASIC.

SUMMARY OF THE INVENTION

The present invention relates to a data generator that reads out a stream of M-bit parallel data from a data stream memory and converts M-bit parallel data to K-bit parallel data wherein K is smaller than M. M may be 480, for example, and the K-bit parallel data can have an arbitrary word length at the same time. The present invention is intended to use a large amount of fast memory. The operational characteristics of DDR3 SDRAM make such memory usable as the data stream memory for this invention. That is, the burst length of the DDR3 SDRAM is eight so that a plurality of the DDR3 SDRAMs used in parallel allows eight or less sets of the parallel data can be read out correctly at high seed. The operations of the present invention are available at relatively lower speed so that the features of the present invention can be realized as a lower cost FPGA rather than ASIC.

A data generator according to the present invention has a data stream memory storing data streams each of which have a plurality of M-bit (M is a natural number) parallel data. A sequence memory stores address information of the data streams and data discard information that indicates how many data bits are discarded in the last parallel data in the data stream. A sequence controller receives the address information and provides addresses to read the data stream from the data stream memory and the data discard information corresponding to the read data stream. If the effective data bits in the last parallel data in a data stream are less than M based on the data discard information, then a data shifter shifts the data in the next data stream. A data shift controller produces data enables indicating the respective data in the data stream that are effective data bits and not-effective data bits based on the data discard information. A combiner combines the effective data of the data steams from the data shifter using the data enables. A parallel to serial converter reduces the bit width of the combined parallel data to accelerate the speed.

The data generator according to the present invention may further have buffers such as FIFOs and a data timing controller. The sequence memory may further store data stream start and end information as flags indicating the start of parallel data in each data stream and the end of parallel data in each data stream. If the effective bit number of the last data in the data stream is less than M the data shift controller shifts the data stream end information to a location prior to the last parallel data. The buffers sequentially receive the data streams from the data shifter together with the data stream start and end information to sequentially provide the data streams. When the data timing controller detects the data stream end information from one of the buffers, it controls another buffer to get started providing the next data stream in order to align timing of the last parallel data in the former data stream and the first parallel data in the next parallel data.

The data generator further includes a reference clock generator for providing a reference clock to the read output of the parallel to serial converter. A first clock generator provides a first clock to the sequence memory, the sequence controller, the data shifter and data shift controller and the write input of the FIFOs. A second clock generator in the form of a divider receives the reference clock and provides a second clock having a frequency lower than that of the first clock to the read output of the FIFOs and the write input of the parallel to serial converter.

The objects, advantages and other novel features of the present invention are apparent from the following detailed description when read in conjunction with the appended claims and attached drawings.

DETAILED DESCRIPTION OF THE INVENTION

Preferred embodiments according to the present invention are shown in the figures and described below. These embodiments are by example only and do not limit the scope of the present invention as set forth in the accompanying claims.

Figure 3:
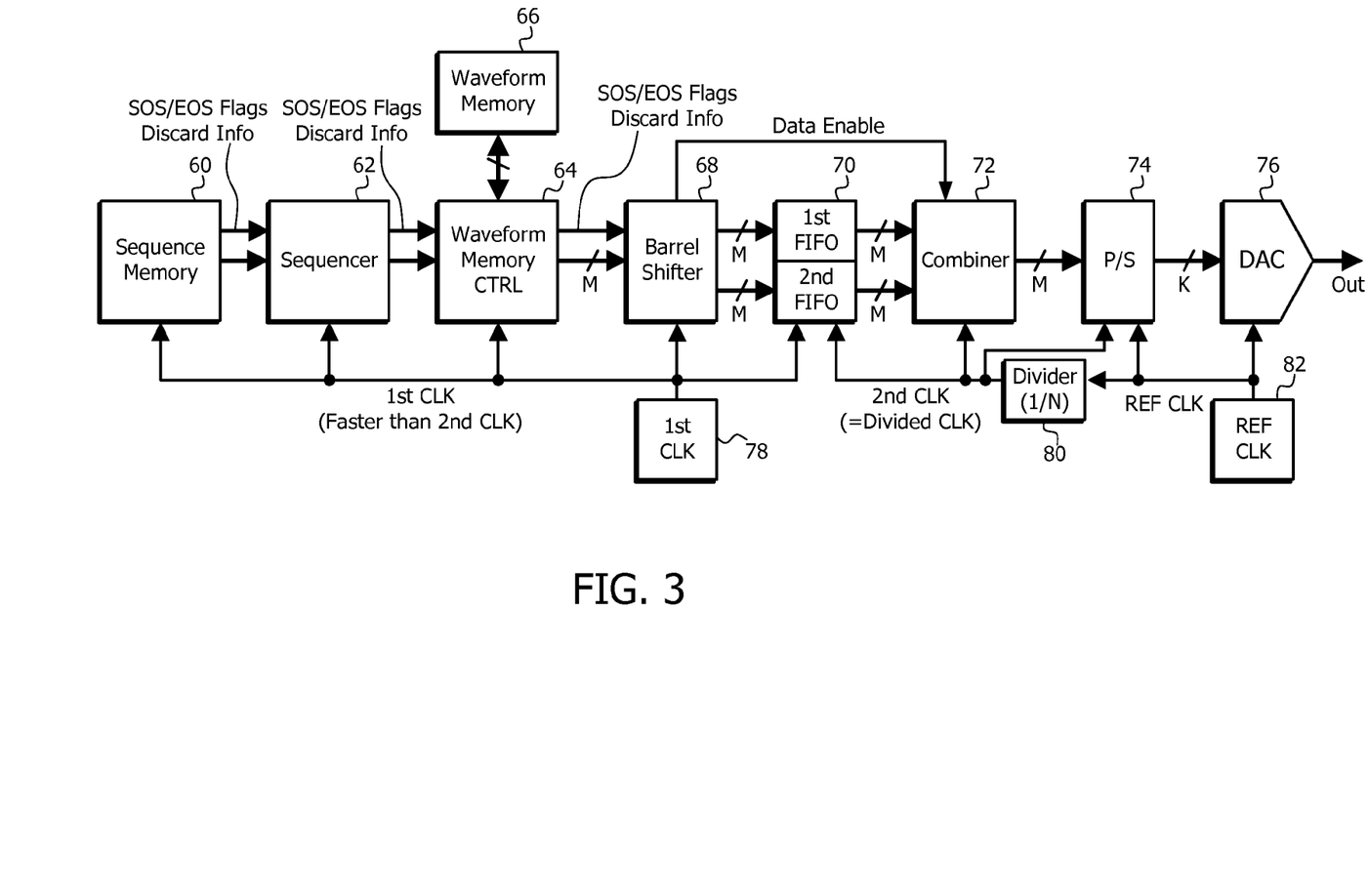
FIG. 3 is a block diagram of a signal generation circuit suitable for implementing the present invention.

FIG. 3 is a block diagram of a data generator according to the present invention usable in a signal generation circuit 16 of the signal generator. The data generator provides a digital-to-analog DAC 76 with fast parallel data having an arbitrary word length that is definable by a user. A reference clock generator 82 generates a reference clock that is provided to the DAC 76. The DAC 76 generates an output according to the reference clock. A divider 80 receives the reference clock and divides the reference clock by a dividing ratio N to produce a divided clock that is synchronous with the reference clock and has a frequency is of 1/N of the reference frequency. In the description below, the divided clock is called a second clock.

A first clock generator 78 provides a first clock whose frequency is faster than that of the second clock. A barrel shifter 68 conducts data shifting processes according to the faster first clock, which allows the barrel shifter 68 to have a time margin for the processes relative to the processes according to the second clock.

A waveform memory 66 may be realized using a plurality of parallel Dynamic Random Access Memory (DRAMs), such as Double Data Rate 3 Synchronous Dynamic Random Access Memory (DDR3 SDRAMs), to provide a large amount of parallel data. The burst length of DDR3 SDRAMs is eight so that a burst operation enables the DDR3 SDRAMs to read out eight or less sets of the parallel data as a group during eighth clocks of the first clock. The group of parallel data read out during the burst operation is called a "Data Stream", hereinafter, wherein the bit number of each set of the parallel data is M (M is a natural number) where M may be 480, for example. M may be a considerably larger number relative to the conventionally used one. The waveform memory 66 stores a plurality of data streams that may be created with known waveform editor software. The ArbExpress manufactured by Tektronix, Inc., Beaverton, Oreg., is one such waveform editor software. ArbExpress allows editing and storing of the waveform data using the signal generator or the waveform data can be generated using a PC and loaded into a signal generator.

A sequence memory 60 stores sequence information of the data streams to be read out from the memory 66 and data discard information that indicates how many data bits are to be discarded from the last data bits of each data stream. The sequence information includes the start address and the data length. The sequence memory 60 further stores data stream start information "SOS (Start of Stream) flag" and data stream end information "EOS (End of Stream) flag" (see a left area of FIG. 5).

A sequencer 62 receives the sequence information; the data discard information and the SOS and EOS flags from the sequence memory 60 and provides them to a waveform memory controller 64. The waveform memory controller 64 generates addresses that access the waveform memory 66 from the sequence information to read the data streams burst by burst from the waveform memory 66. The waveform memory controller also provides the data discard information and the SOS/EOS flags corresponding to the read out data stream to a barrel shifter 68. As described, the sequence 62 and the waveform memory controller 64 works as a sequence controlling means and are adapted for the burst operation of the DDR SDRAM.

Figure 4:
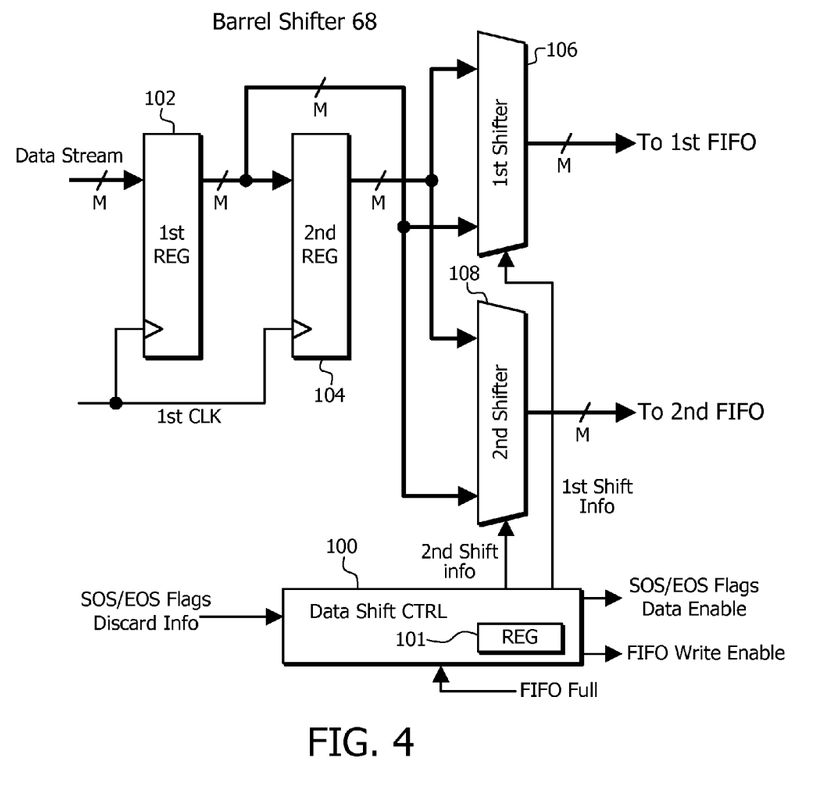
FIG. 4 is a block diagram of an embodiment of a barrel shifter.
Figure 5:
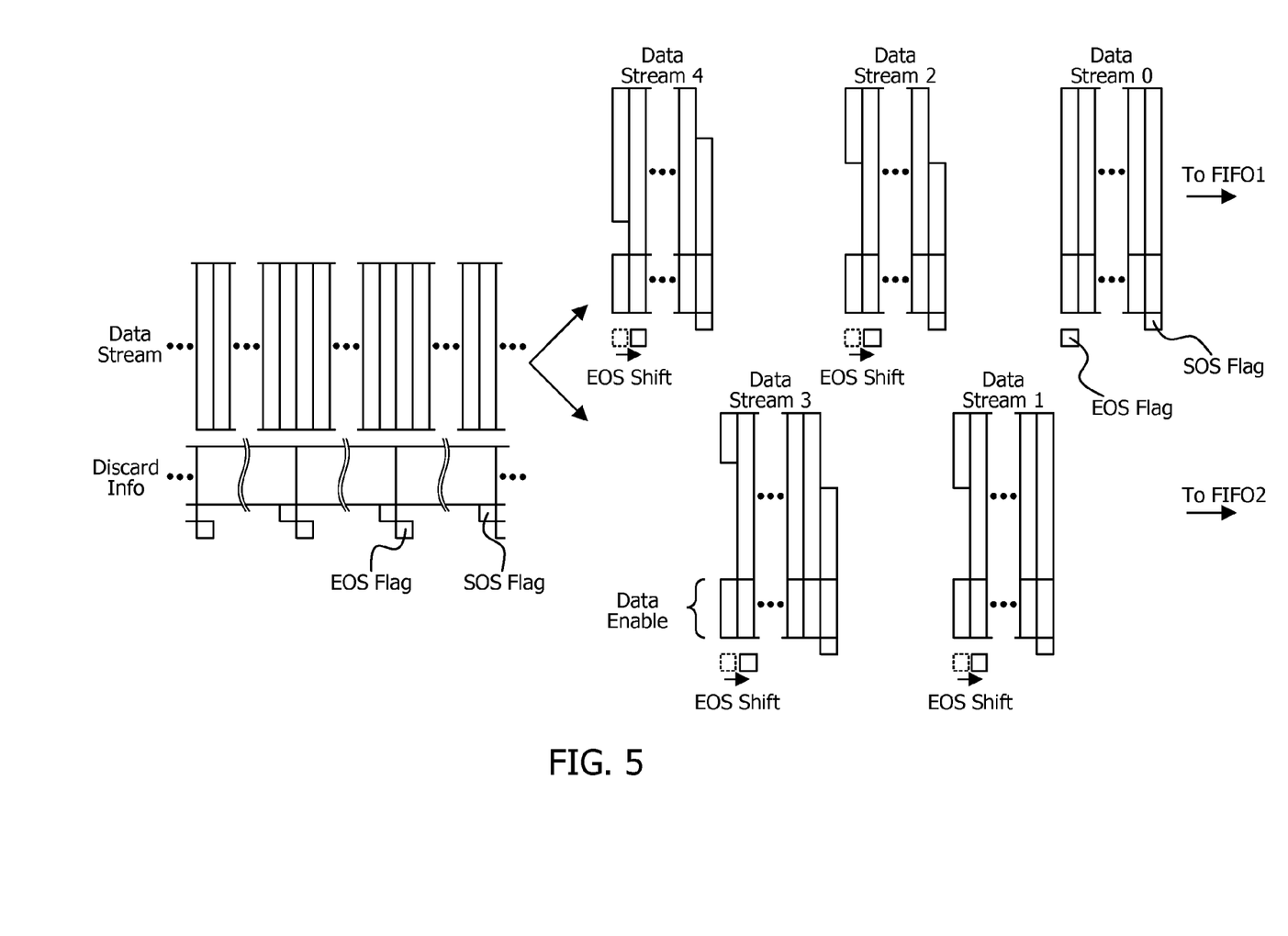
FIG. 5 is a process flow of the barrel shifter

FIG. 4 is a block diagram of the barrel shifter 68. First and second registers 102 and 104 sequentially receive the M-bit parallel data from the waveform memory controller 64 according to the first clock. The respective sets of the parallel data retained in the first and second registers 102 and 104 have a time difference of one clock, and the second register 104 receives the M-bit parallel data from the first register 102 one clock after being in the first register 102. First and second shifters 106 and 108 each receive the M-bit parallel data from both the first and second registers 102 and 104. Each shifter 106 and 108 provides M-bit parallel data by selecting M-bit data from among the received two sets of the M bit data according to first or second data shift information from a data shift controller 100. If there is no data shift (to be described below), each shifter 106 and 108 selects the M bit data from the first register 102. The first and second shifters 106 and 108 provide the M-bit parallel data alternatively as shown in FIG. 5 of which horizontal direction is time axis. The shifters 106 and 108 may be implemented as a plurality of multiplexers that shift the data by a desired number of bits.

Figure 6:
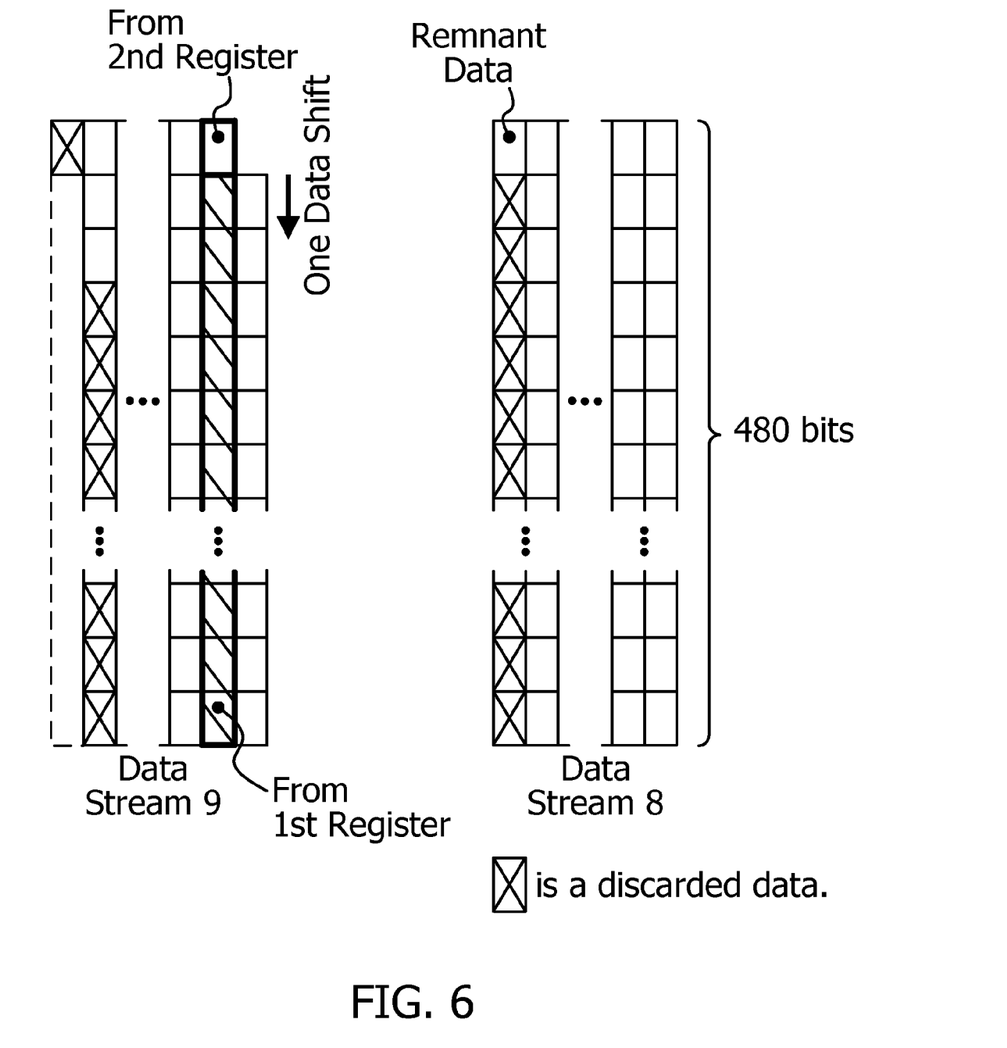
FIG. 6 is an example of data shift operation concerning adjacent data streams.

FIG. 6 is an example of data shift operation by the first and second shifters 106 and 108. In this example, M is 480, the first shifter 106 provides a data stream 8, and the second shifter 108 provides a data stream 9. The respective suffixes in the data stream names are output order of the data streams in this example. The MSB (most significant bit) of the last parallel data in the data stream 8 remains but the other data are discarded according to the data discard information. In this case, the data shift controller 100 provides the second shifter 108 with shift information instructing one data shift. The second shifter 108 conducts one data shift on the first parallel data in the data stream 9 by selecting 479 data excluding the LSB of the parallel data from the first register 102. It conducts a data shift on the second parallel data in the data stream 9 by selecting the LSB (Least Significant Bit) of the parallel data from the second register 104 and 479 data (shown as hatched ones) excluding the LSB of the parallel data from the first register 102 that bring the total to 480 data. It is similar for the third parallel data in the data stream 9.

The data shift controller 100 determines the first and second data shift information provided to the first and second shifters 106 and 108 by receiving the data discard information. It also receives the SOS and EOS flags to provide a write enable signal making one of the first and second FIFOs write enable every time the EOS flag arrives. The data shift information is stored in a register 101 as is determined because the data shift information used in the next time may dynamically change depending on the data shift amount and the data discard information. The data shift controller 100 also determines data enable information of the data stream depending on the data discard information and provides the FIFOs with it together with the corresponding SOS/EOS flags for the corresponding data stream.

If the last parallel data in a data stream becomes less than M bits because of the data shift or the data discard, the EOS flag located at the same timing as the last parallel data may be shifted to a timing location of one or more clocks before (EOS Shift). The shift amount of the EOS flag may be determined depending on how much time the FIFO requires to read the data stream.

Figure 7:
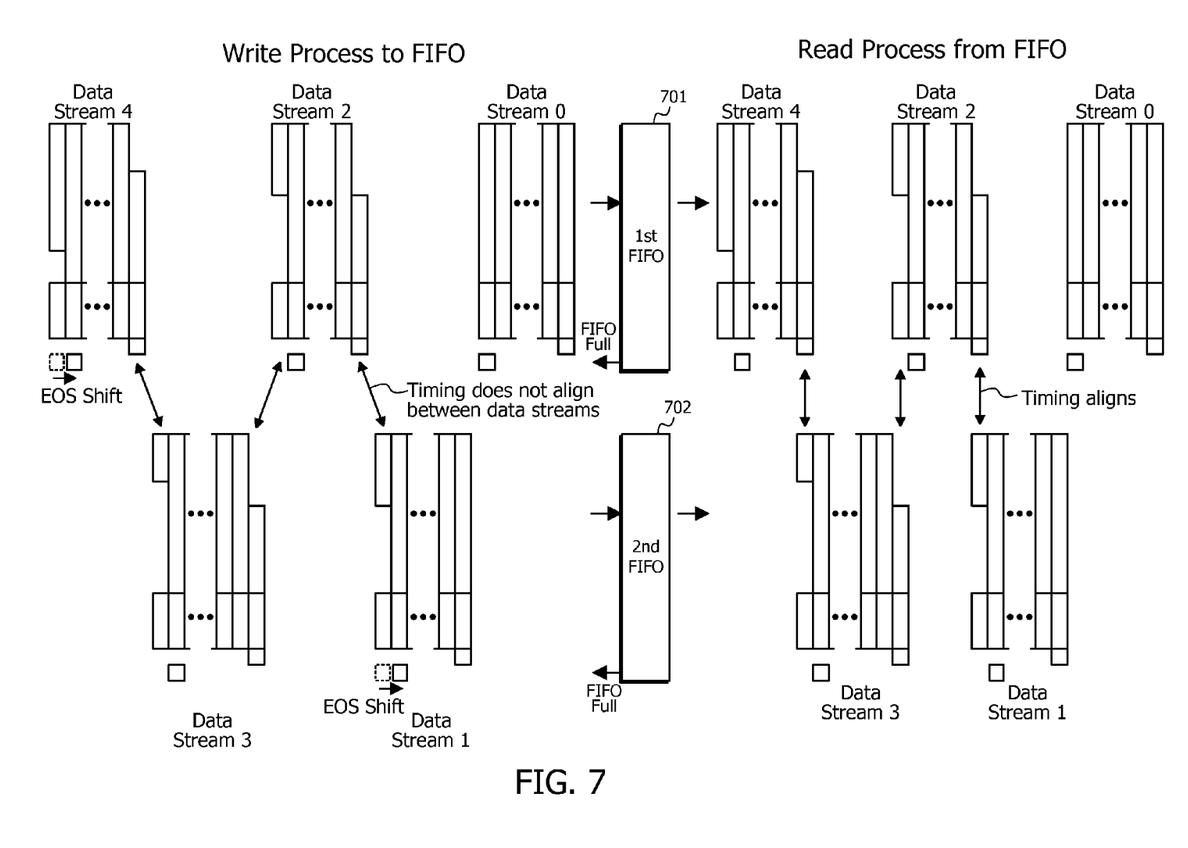
FIG. 7 is an example of timing relationship between data streams before input to FIFOs and after output of FIFOs.

FIG. 7 is a timing chart depicting relationship between data streams before input to FIFOs and after output of FIFOs. First and second FIFOs 701 and 702 may be asynchronous FIFOs that receives a data stream input according to the first clock and provides a data stream output according to the second clock. The first and second FIFOs 701 and 702 have FIFO full ports at the write port side to inform the data shift controller 100 of whether the respective FIFOs are available or not. As shown in FIG. 7, timing between the data streams may not be aligned before being written into the first or second FIFO because of read-out characteristics of the waveform memory. When one of the first and second FIFOs 701 and 702 provides the EOS flag together with the data stream, the other FIFO starts to provide the next data stream. This operation allows time aligning between the last parallel data having less M bits in a data stream and the first parallel data in the next data stream. Alternatively, if the last parallel data in a data stream has M bits, the timing is adjusted as the first parallel data in the next data stream located at the timing of the next clock of the last parallel data.

In the example described above, the barrel shifter 68 uses the first and second shifters 106 and 108 for the data shift to discard an arbitrary large number of data. If the waveform memory controller 64 is realized as ASIC, it could handle the data discard of such a large number of data since the ASIC operates fast. However, if the waveform memory controller 64 is realized as FPGA for low cost, the process speed is not enough to discard such a large number of data. As a solution to this issue, the barrel shifter 68 and the FIFO 70 have two passes to process the data streams and the data discard information and the SOS and EOS flags are used to allow discarding such an arbitrary large number of data. Note that the above example uses two passes but three or more passes may be used.

Figure 8:
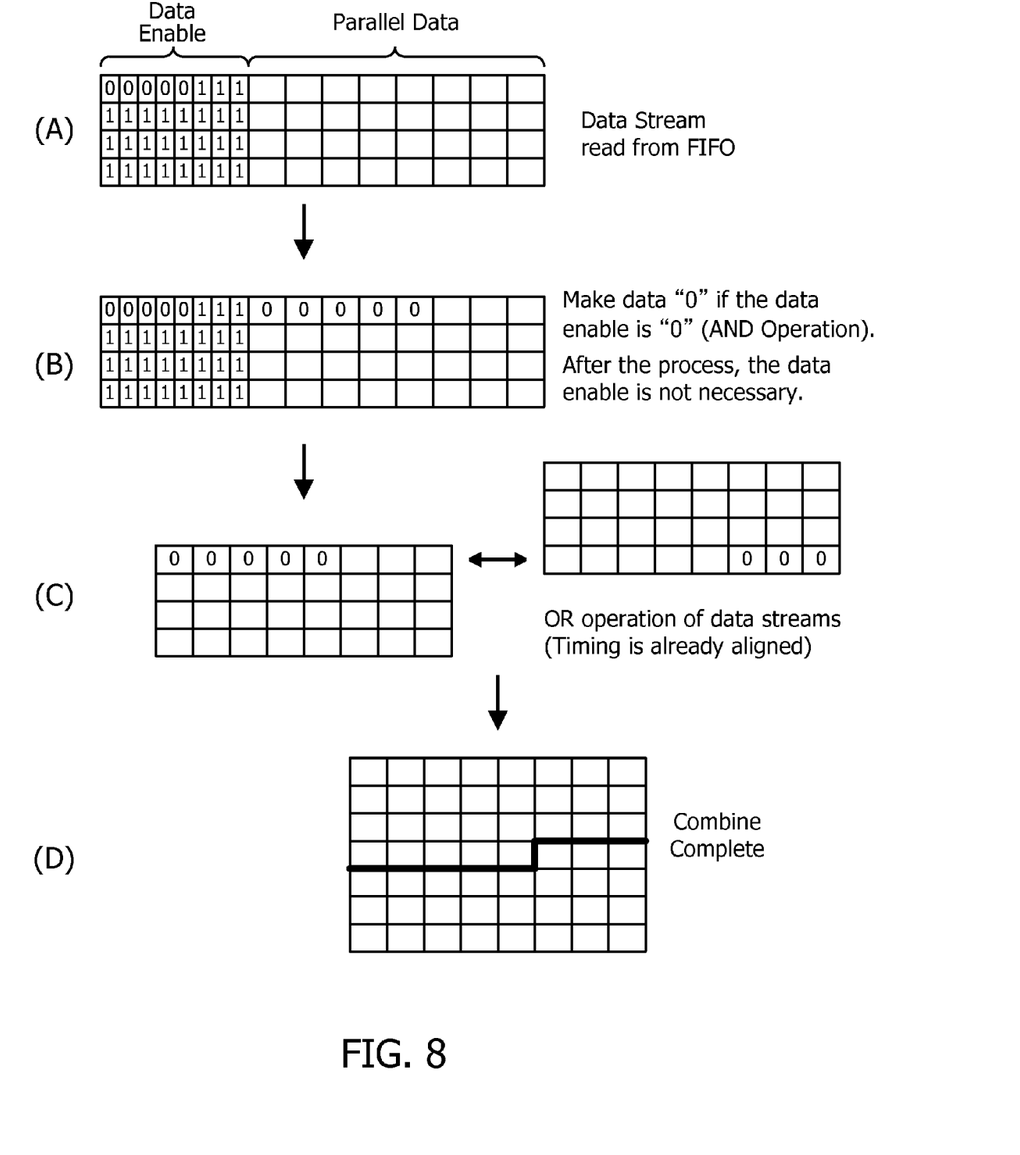
FIG. 8 is a process flow of combining data streams.

Referring to FIG. 3, a combiner 72 receives the data streams in which timing is aligned from the first and second FIFOs 701 and 702 and combines the data streams to produce parallel data having only effective data. FIG. 8 is a process flow of combining data streams wherein the bit width of the parallel data is made smaller for the sake of simplicity. Referring to FIG. 8A, data enables correspond to the respective data of the parallel data wherein "0" indicates discard of the corresponding parallel data and "1" indicates the corresponding effective parallel data. As shown in FIG. 8B, the combiner 72 conducts logical AND operations between the data enables and the respective data in the parallel data to make the discard data "0". After this process, the data enables are not necessary. The logical AND operation is applied for the data in the parallel data from both the first and second FIFOs as shown in FIG. 8B. Referring to FIG. 8C, a logical OR operation is conducted for both of the data streams to produce combined parallel data having only effective data as shown in FIG. 8D.

A parallel to serial converter 74 converts the M-bit parallel data from the combiner 72 to K bit parallel data wherein K is less than M (M=K×N). The data generator described above reads out sets of M-bit parallel data from the waveform memory 66 but the effective data number is not limited to an integer multiple of M but can be an integer multiple of K. That is, it can generate an arbitrary word length of K bit parallel data. Note that if K is 1, it can also generate an arbitrary length of a serial data pattern.

The digital to analog converter (DAC) 76 converts the K-bit parallel data into an analog electric signal. The output of the DAC 76 may passes through a low pass filer (not shown) to produce a smooth analog signal as is known.

Although the invention has been disclosed in terms of the preferred and alternative embodiments disclosed herein, those skilled in the art will appreciate that modifications and improvements may be made without departing from the scope of the invention.

What is claimed is:

1. A data generator comprising:
   means for storing a plurality of data streams with each data stream having sets of M-bit parallel data (M is a natural number) defining a group of the parallel data;
   means for storing sequence information and data discard information indicating how many data bits are discarded from the ending data bits in each data stream;
   a sequence controller for providing address information derived from the sequence information to the parallel data storing means to read the data streams and providing the data discard information corresponding to the respective data streams;
   means for shifting data in a next data stream according to the number of effective data bits of the last M-bit parallel data in a current data stream when said number of effective data bits is less than M based on the data discard information;
   a data shift controller for generating data enables indicating the respective data in the data stream that are effective data bits and not-effective data bits based on the data discard information;
   a data stream combiner for combining the effective data bits in the data streams from the data shifting means using the data enables to provide M-bit parallel data having only the effective data bits; and
   a parallel to serial converter for converting the M-bit parallel data in the combined data streams to K-bit parallel data wherein K is a natural number equal to one and less than M.

2. The data generator as recited in claim 1 further comprising:
   at least first and second buffers; and
   a data timing controller;
   wherein the sequence information storing means further stores data stream start and end information indicating the start of parallel data in each data stream and the end of parallel data in each data stream;
   the data shift controller shifts the data stream end information to a location before the last parallel data in the data stream if the last parallel data has the effective data bits less than M based on the data discard information;
   the first and second buffers sequentially receive the data streams from the data shifting means while receiving the data stream start and end information to provide the data streams; and
   the data timing controller detects the data stream end information from one of the buffers to control the other buffer to initiate the providing of the next data stream in order to align timing of the last parallel data in the current data stream and the first parallel data in the next data stream.

3. The data generator as recited in claim 2 wherein the buffers comprise a plurality of First-In-First-Out (FIFO) buffers.

4. The data generator as recited in claim 1 wherein the data shifting means comprises is a barrel shifter for shifting the data bits in the next data stream as a function of the number of data bits determined by the data discard information.

5. The data generator as recited in claim 1 wherein the data shifting means further comprises a series of registers retaining a series of the M-bit parallel data for providing one set of the M-bit parallel data by selecting from the series of the M-bit parallel data.

6. The data generator as recited in claim 5 wherein the data shifting means further comprises a plurality of multiplexers for selecting one set of the M-bit parallel data from the series of the M-bit parallel data.

7. The data generator as recited in claim 1 wherein means for storing parallel data provides each data stream during a burst mode.

8. The data generator as recited in claim 1 wherein means for storing parallel data comprises one of a family of Double Data Rate Synchronous Dynamic Random Access Memory (DDR SDRAM).

9. A data generator comprising:
   a reference clock generator for providing a reference clock;
   a first clock generator for providing a first clock;
   a second clock generator for providing a second clock that is derived from dividing the reference clock and having a frequency lower than that of the first clock;
   means for storing a plurality of data streams with each data stream having sets of M-bit parallel data (M is a natural number) defining a group of the parallel data;
   means for storing sequence information and data discard information indicating how many data bits are discarded from the ending data bits in each data stream;
   a sequence controller for providing address information derived from the sequence information to the parallel data storing means to read the data streams and providing the data discard information corresponding to the respective data streams;
   means for shifting data in a next data stream according to the number of effective data bits of the last M-bit parallel data in a current data stream when said number of effective data bits is less than M based on the data discard information;
   a data shift controller for generating data enables indicating the respective data in the data stream that are effective data bits and not-effective data bits based on the data discard information;
   at least first and second buffers for sequentially receiving the data streams from the data shifting means according to the first clock and receiving data stream start and end information to provide the data streams according to the second clock;
   a data stream combiner for combining effective data bits in the data streams from the data shifting means using the data enables to provide M-bit parallel data having only the effective data bits; and
   a parallel to serial converter receiving the M-bit parallel data in the combined data streams according to the second clock and providing K-bit parallel data according to the reference clock wherein K is a natural number equal to one and less than M.

10. The data generator as recited in claim 9 wherein the first and second buffers sequentially provide time aligning of the data stream of the last parallel data in the current data stream to that of the first parallel data in the next data stream if the number of the effective data bits in the last parallel data in the current data stream is less than M.

11. The data generator as recited in claim 9 wherein the buffers comprise a plurality of asynchronous First-In-First-Out (FIFO) buffers.

12. The data generator as recited in claim 9 wherein the data shifting means comprises is a barrel shifter for shifting the data bits in the next data stream as a function of the number of data bits determined by the data discard information.

13. The data generator as recited in claim 9 wherein the data shifting means further comprises a series of registers retaining a series of the M-bit parallel data for providing one set of the M-bit parallel data by selecting from the series of the M-bit parallel data.

14. The data generator as recited in claim 13 wherein the data shifting means further comprises a plurality of multiplexers for selecting one set of the M-bit parallel data from the series of the M-bit parallel data.

15. The data generator as recited in claim 9 wherein means for storing parallel data provides each data stream during the burst mode.

16. The data generator as recited in claim 9 wherein means for storing parallel data comprise one of a family of Double Data Rate Synchronous Dynamic Random Access Memory (DDR SDRAM).

* * * * *